United States Patent
Arimilli et al.

(10) Patent No.: US 6,192,458 B1
(45) Date of Patent: Feb. 20, 2001

(54) HIGH PERFORMANCE CACHE DIRECTORY ADDRESSING SCHEME FOR VARIABLE CACHE SIZES UTILIZING ASSOCIATIVITY

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/046,015

(22) Filed: Mar. 23, 1998

(51) Int. Cl.[7] ................................................. G06F 12/00
(52) U.S. Cl. ............................ 711/220; 711/128; 711/119
(58) Field of Search ............................... 711/3, 128, 220, 711/117, 118, 122, 119

(56) References Cited

U.S. PATENT DOCUMENTS

| | | | |
|---|---|---|---|
| 4,797,814 | * 1/1989 | Brenza | 711/3 |
| 5,367,653 | * 11/1994 | Coyle et al. | 711/128 |
| 5,392,410 | * 2/1995 | Liu | 711/3 |
| 5,418,922 | * 5/1995 | Liu | 711/3 |
| 5,522,056 | * 5/1996 | Watanabe et al. | 711/128 |
| 5,680,577 | * 10/1997 | Aden et al. | 711/150 |
| 5,835,928 | * 11/1998 | Auslander et al. | 711/3 |
| 5,897,651 | * 4/1999 | Cheong et al. | 711/3 |
| 5,924,128 | * 7/1999 | Luick et al. | 711/220 |
| 5,943,686 | * 8/1999 | Arimilli et al. | 711/146 |

FOREIGN PATENT DOCUMENTS

| | | | |
|---|---|---|---|
| 4-127339 | 4/1992 | (JP) | G06F/12/08 |
| 5-12119 | 1/1993 | (JP) | G06F/12/08 |
| 1-280850 | 11/1998 | (JP) | G06F/12/08 |
| 11060255 | 3/1999 | (JP) | C03B/23/023 |
| 11060298 | 3/1999 | (JP) | C04B/14/28 |

* cited by examiner

*Primary Examiner*—John W. Cabeca
*Assistant Examiner*—Brian R. Peugh
(74) *Attorney, Agent, or Firm*—Volel Emile; Felsman, Bradley, Vaden, Gunter & Dillon, LLP (57) ABSTRACT

To avoid multiplexing within the critical address paths, the same address field is employed as a index to the cache directory and cache memory regardless of the cache memory size. An increase in cache memory size is supported by increasing associativity within the cache directory and memory, for example by increasing congruence classes from two members to four members. For the smaller cache size, an additional address "index" bit is employed to select one of multiple groups of address tags/data items within a cache directory or cache memory row by comparison to a bit forced to a logic 1.

22 Claims, 4 Drawing Sheets

HIGH PERFORMANCE CACHE DIRECTORY ADDRESSING SCHEME FOR VARIABLE CACHE SIZES UTILIZING ASSOCIATIVITY

BACKGROUND OF THE INVENTION

1. Technical Field

The present invention relates in general to upgradeable caches in data processing systems and in particular to cache directory addressing schemes for upgradeable caches. Still more particularly, the present invention relates to a cache directory addressing scheme which reduces delay in the critical address path for upgradeable caches in data processing systems.

2. Description of the Related Art

Contemporary data processing systems commonly employ upgradeable caches for staging data from system memory to the processor(s) with reduced access latency. For example, a data processing system may be marketed with a 256 KB cache which is upgradeable to 512 KB, or a 2 MB cache upgradeable to 4 MB. The upgradeable cache then provides different price-per-performance points for a user purchasing a data processing system. In order to have common directory support for multiple cache sizes, traditional systems generally increase sector size when upgrading. Such cache upgrades are thus typically supported in a data processing system by permitting selection of different cache directory addressing schemes depending on the size of the cache. The different cache directory addressing schemes may rely on different cache line lengths, utilizing different address bits to select a cache line, to serve as the intra-cache line address, and/or to serve as an address tag. A traditional cache directory addressing scheme of the type currently utilized to support an upgradeable cache in a data processing system is depicted in FIG. 3.

Figure 3:
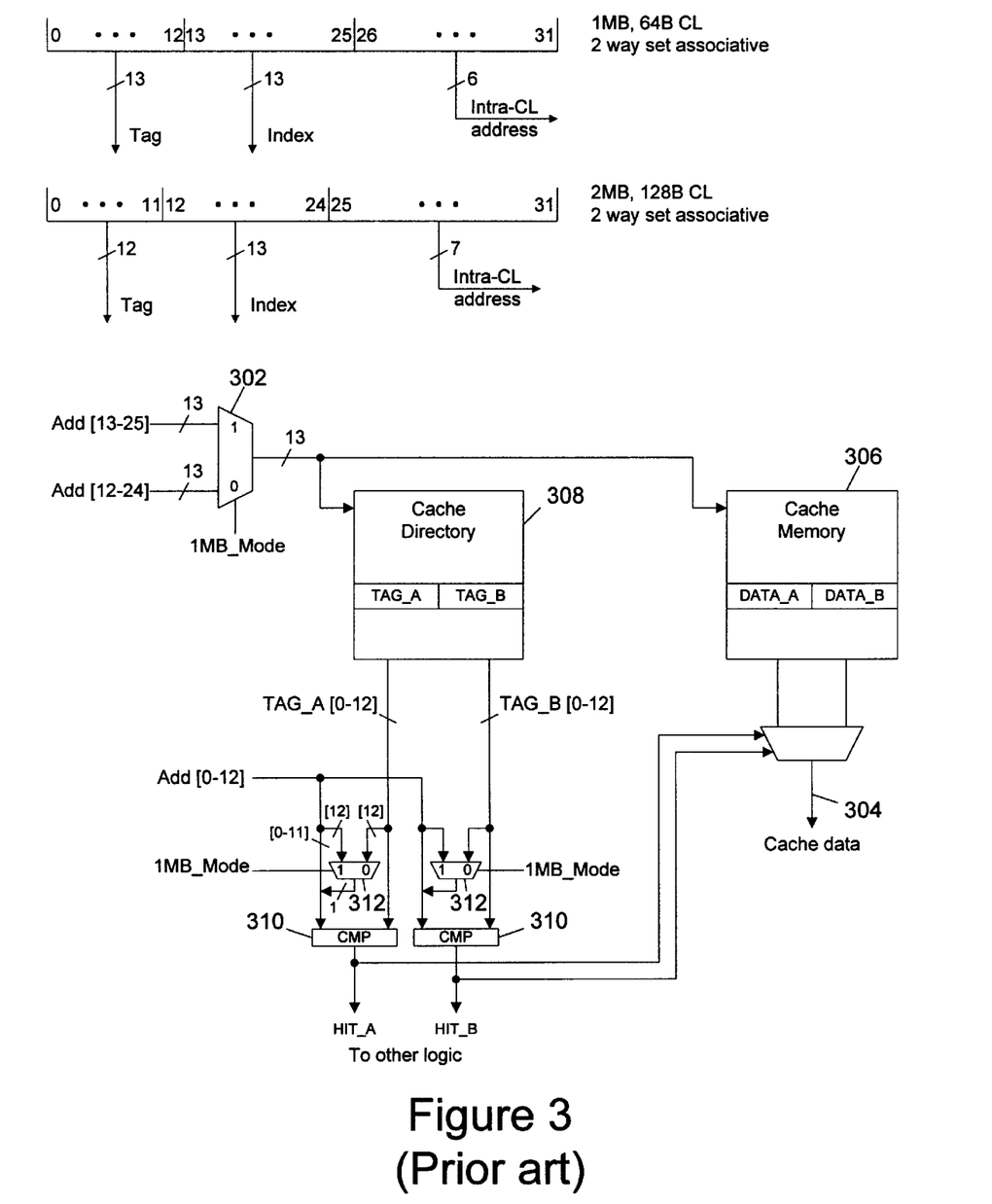
FIG. 3 depicts a prior art cache directory addressing scheme.

FIG. 3 depicts a cache directory addressing scheme for a 32 bit data processing system using a two-way set associative cache upgradeable from 1 MB to 2 MB. The 1 MB cache directory addressing configuration employs a 64 byte cache line. A cache line is the block of memory which a coherency state describes, also referred to as a cache block. When addressing a 1 MB cache, bits 26–31 (6 bits) of the address specify an intra-cache line address, bits 13–25 (13 bits) of the address are utilized as an index to a set of two cache lines in the cache directory and the cache memory, and bits 0–12 (13 bits) of the address are utilized as the cache line address tag to identify a particular cache line within the set of two. The index field specifies a row or congruence class within the cache directory and memory containing a set of two cache lines, the address tag field identifies a member of the specified congruence class (i.e. a particular cache line within the set of two cache lines), and the intra-cache line address field allows a particular byte to be selected from the identified congruence class member (cache line).

The 2 MB cache directory addressing configuration employs a 128 byte cache line with bits 25–31 (7 bits) of the address determining an intra-cache line address, bits 12–24 (13 bits) of the address being utilized as an index to the cache directory and the cache, and bits 0–11 (12 bits) of the address being utilized as the cache line address tag. In order to operate in the original system of 64 byte cache lines, the 128 byte cache line is sectored as two 64 byte cache lines. Thus, when upgrading the cache memory size, the index field is shifted down to increase the number of bits available for intra-cache line addressing within a larger cache line.

One problem with the approach to implementing a selectable cache directory addressing system of the type described above derives from the necessity of selecting different address bits to serve as the index field, depending on the size of the cache memory currently in place. Typically a multiplexer 302 is employed to selected which thirteen address bits, [7:25] or [6–24], are passed to the cache directory and memory to be utilized as the index for selection of a particular set of four cache lines. However, multiplexer 302 introduces a delay in getting the index field from the address to cache directory 308 to begin looking up the address. Cache memory 306 access is also critical, with delay similarly being introduced by multiplexer 302 in the look up of an indexed cache line.

In general, three critical paths may be identified within the mechanism depicted in FIG. 3: from the address bus inputs Add[13–25] or Add[12–24] to cache data output 304 via cache memory 306; from the address bus inputs to cache data output 304 via cache directory 308; and from the address bus inputs to other logic (e.g., logic for victim selection or for driving a retry signal) at the outputs HIT_A and HIT_B of comparators 310. Each of these critical paths includes multiplexer 302 and the attendant delay and space requirement. Moreover, multiplexers 312 between cache directory 308 and comparators 310 are required to determine whether address line [12] is compared to address tag [12] or to itself. These multiplexer requirements are necessary on both the processor side address flow within a cache and the snoop side address flow. Multiplexing of address bus lines to select the appropriate index field is also required for the address flow to address queues for loading addresses and pipeline collision detection. Thus, employing an upgradeable cache memory in a data processing system incurs a performance penalty over cache memories which cannot be upgraded.

It would be desirable, therefore, to provide a cache directory addressing scheme for variable cache sizes which does not include any additional gate delays in the critical address path. It would further be advantageous if the cache directory addressing scheme utilized did not require different sized address tags to be compared depending on the size of the cache memory employed.

SUMMARY OF THE INVENTION

It is therefore one object of the present invention to provide an improved upgradeable cache for use in data processing systems.

It is another object of the present invention to provide an improved cache directory addressing scheme for upgradeable caches.

It is yet another object of the present invention to provide a cache directory addressing scheme which reduces delay in the critical address path for upgradeable caches in data processing systems.

It is still yet another object of the present invention to further improve system performance via more associativity when upgrading caches.

The foregoing objects are achieved as is now described. To avoid multiplexing within the critical address paths, the same address field is employed as a index to the cache directory and cache memory regardless of the cache memory size. An increase in cache memory size is supported by increasing associativity within the cache directory and memory, for example by increasing congruence classes from two members to four members. For the smaller cache size, an additional address "index" bit is employed to select one of multiple groups of address tags/data items within a cache directory or cache memory row by comparison to a bit forced to a logic 1.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
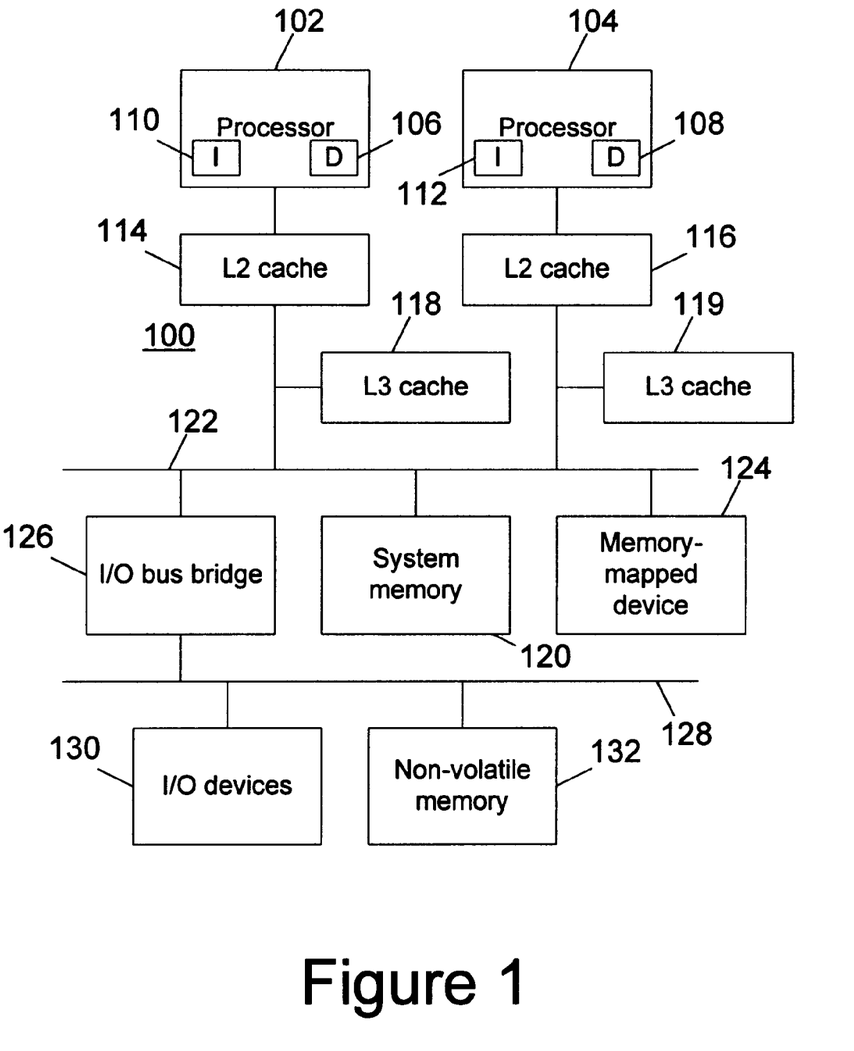
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction and an address and/or data. Each device connected to system bus 122 preferably snoops all communication transactions on system bus 122, intervening in communications transactions intended for other recipients when necessary and reproducing changes to system memory data duplicated within the device when feasible and appropriate.

Figure 2A:
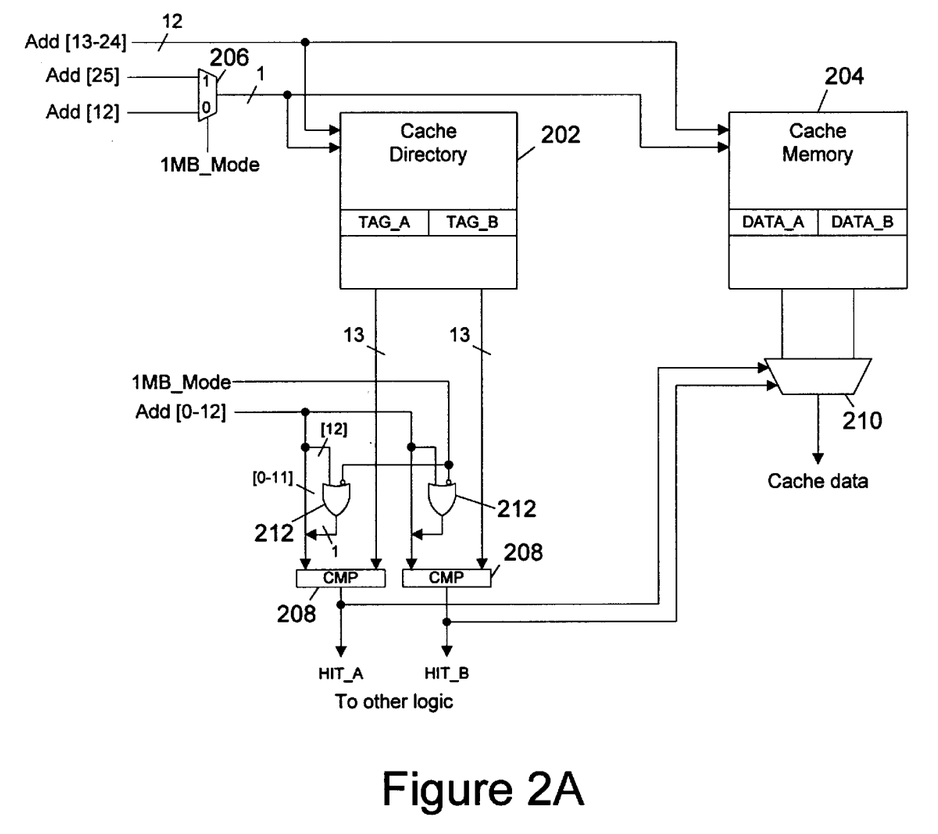
FIG. 2A is a diagram of a cache configuration for a common cache directory addressing scheme in accordance with a preferred embodiment of the present invention.

Referring to FIG. 2A, a diagram of a cache configuration for a common cache directory addressing scheme in accordance with a preferred embodiment of the present invention is illustrated. The cache directory and memory configuration depicted may be utilized for any cache depicted in FIG. 1 which is upgradeable, including L2 caches 114 and 116 and L3 caches 118 and 119. The exemplary embodiment of the cache directory addressing scheme described relates to a two-way set associative cache upgradeable from 1 MB to 2 MB. However, the common cache directory addressing scheme of the present invention may be implemented, with appropriate modifications, for any size cache utilizing an arbitrary amount of associativity at any level of a data processing systems storage hierarchy.

The cache directory addressing scheme depicted in FIG. 2A for a 1 MB, two-way set associative cache employs a 64 byte cache line with bits 26–31 (6 bits) of the address determining an intra-cache line address, bits 13–24 (12 bits) of the address serving as an index to the rows in the cache directory and the cache memory, bits 0–12 (13 bits) of the address being utilized as the address tag, and bit 25 used for selection of a set of cache lines and their corresponding address tags from the same rows within the cache memory and directory, as described in greater detail below. The cache directory addressing scheme depicted in FIG. 2A for a 2 MB, two-way set associative cache employs a 128 byte cache line with bits 25–31 (7 bits) of the address determining an intra-cache line address, bits 13–24 (12 bits) of the address serving as an index to the rows in the cache directory and the cache memory, bits 0–11 (12 bits) of the address being utilized as the address tag, and bit 12 selecting a set of cache lines and their corresponding address tags from the cache memory and directory.

Address tags TAG_A and TAG_B within cache directory 202 contain the address tag field of the address for corresponding data DATA_A and DATA_B within cache memory 204. Address bus inputs Add[13–24], corresponding to the index field of the address, are utilized as an index to cache directory 202 and cache memory 204. This index field is employed to select two groups of address tags and cache lines from cache directory 202 and cache memory 204, each group including two address tags and two cache lines in the exemplary embodiment. Depending on the size of the cache employed, address bus input Add[25] or Add[12] is also employed to select a group of address tags/cache lines from cache directory 202 and cache memory 204. Address bus input Add[25] or Add[12] is employed by cache directory 202 and cache memory 204 to select one of the two groups of address tags/cache lines selected based on the index field of the address, Add[13–24]. However, this mechanism may be implemented as a "late select" in accordance with the known art, at the last stage of multiplexing within cache directory 202 and cache memory 204. Thus, the multiplexing function 206 required to select one address bus input from Add[25] and Add[12] may proceed in parallel with the cache directory and memory access based on the index field. The late select mechanism of Add[25] or Add[12] will not increase the latency required for sending TAG_A and TAG_B from cache directory 202 to comparators 208 or DATA_A and DATA_B from cache memory 204 after presentation of an address.

Address tags TAG_A and TAG_B selected from cache directory 202 are passed to comparators 208 for comparison with the address tag field of the presented address. TAG_A and TAG_B within the selected cache directory entries are simultaneously compared to the address tag field of the presented address, with a match resulting in assertion of the corresponding HIT_A or HIT_B signal. When the smaller, 1 MB cache memory is employed, the address tag field comprises bits [0–12]. When the larger, 2 MB cache memory is being employed, however, the address tag field comprises only bits [0–11]. Logic gates 212 are therefore provided to control whether bit [12] of a presented address is compared to bit [12] of address tags TAG_A and TAG_B or to a logic "1". When the 2 MB cache memory is employed, bit [12] of the address tags stored in cache directory 202 is always written to a logic "1". When 1 MB_Mode control signal is asserted (when a 1 MB cache memory is employed), logic gates 212 pass bit [12] of the presented address through to comparators 208 for comparison to bit [12] of TAG_A and TAG_B. When a 2 MB cache memory is employed, however, logic gates 212 pass a logic "1" to comparators 208 as bit [12] of the presented address, for comparison to bit [12] of TAG_A and TAG_B, which is always written to a logic "1". This allows variable sized address tag fields to be employed without the necessity for a multiplexer between cache directory 202 and comparators 208. Logic gates 212 operate in parallel with the access of cache directory 202 and thus do not add any latency to the critical address paths.

Index field Add[13–24] and late select Add[25] or Add[12] are also employed, in the same manner as they are employed by cache directory 202, by cache memory 204 to select cache lines DATA_A and DATA_B corresponding to address tags TAG_A and TAG_B, respectively. Comparator output signals HIT_A and HIT_B are utilized by multiplexer 210 to select one of the two cache lines DATA_A and DATA_B as the cache output in accordance with the known art. Signals HIT_A and HIT_B may also be utilized by other timing-critical logic such as victim selection logic and logic for driving a snoop response such as "retry," "shared," etc.

Although the exemplary embodiment involves a two way set associative cache scheme, other variations are possible such as a four way set associative scheme. In such an embodiment, the index field may be employed to select four groups of address tags/caches lines (congruence classes), each containing four address tags or cache lines. Two bits of the address may be employed as late selects to pass one group of four address tags and cache lines to comparators at the output of the cache directory and to a multiplexer at the output of the cache memory.

Figure 2B:
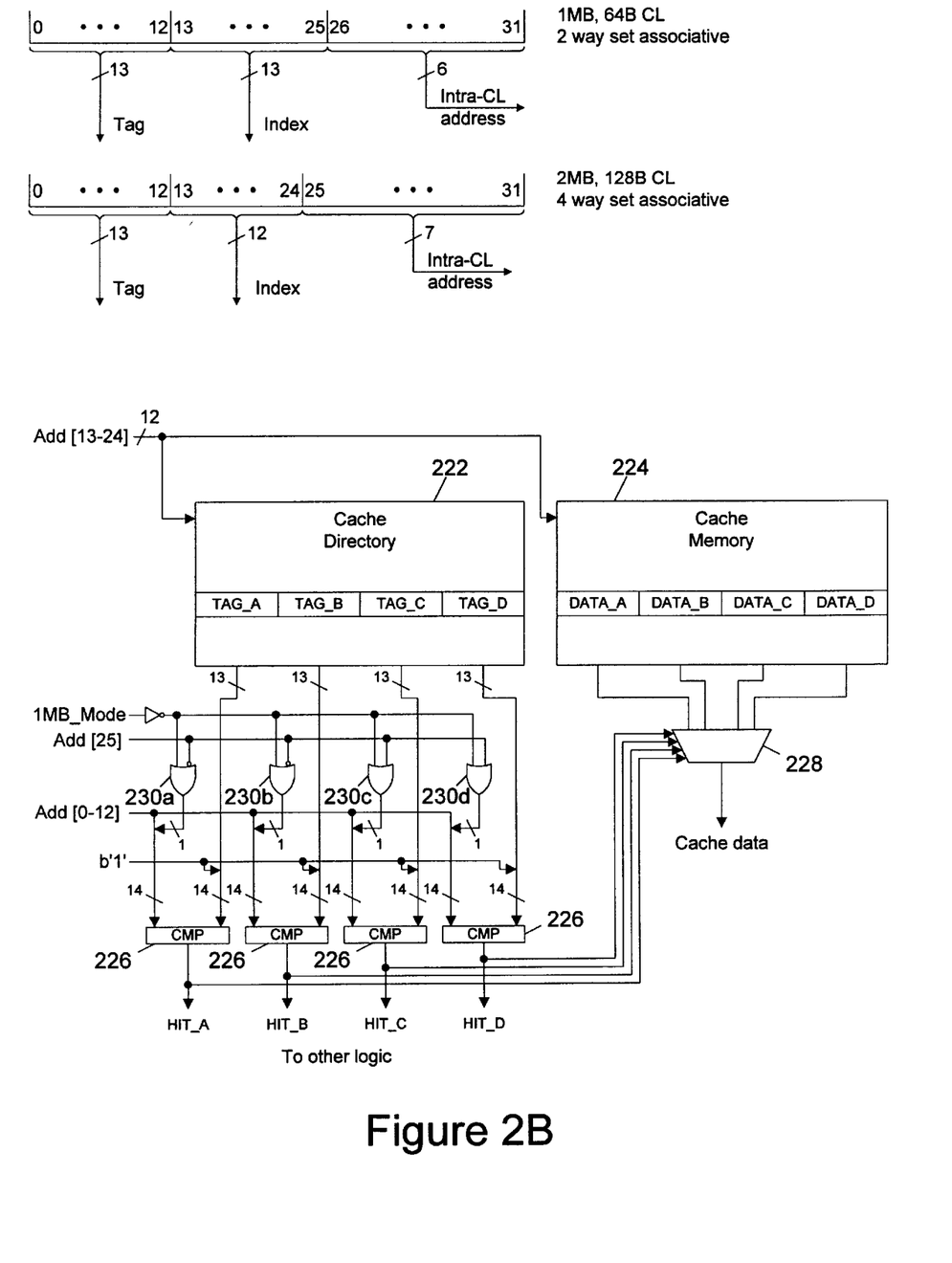
FIG. 2B is a diagram of an alternative embodiment of a common cache directory addressing scheme in accordance with a preferred embodiment of the present invention.

Referring to FIG. 2B, a diagram of an alternative cache configuration for a common cache directory addressing scheme in accordance with a preferred embodiment of the present invention is illustrated. This cache directory and memory configuration may also be utilized for any cache depicted in FIG. 1 which is upgradeable, including L2 caches 114 and 116 and L3 caches 118 and 119. The exemplary embodiment of the alternative cache directory addressing scheme relates to a two-way set associative, 1 MB cache upgradeable to a four way set associative, 2 MB cache. However, the alternative common cache directory addressing scheme of the present invention may be implemented, with appropriate modifications, for any size caches at any level of a data processing systems storage hierarchy.

In the alternative embodiment, the rows (congruence classes) within the cache directory 222 contain four address tags, TAG_A, TAG_B, TAG_C and TAG_D, treated logically as two sets of two address tags during 1 MB operation. Rows within cache memory 224 similarly contain four corresponding cache lines, DATA_A, DATA_B, DATA_C and DATA_D, which are also logically treated as two sets of two cache lines during 1 MB operation. The index field from the presented address, Add[13–24], is utilized to select rows within cache directory 222 and cache memory 224. The address tags within the selected row of cache directory 222 being passed to comparators 226 for comparison with the address tag field, Add[0–12], of the presented address. The cache lines within a selected row of cache memory 224 are similarly passed to multiplexer 228.

The thirteen bits of the address tags TAG_A, TAG_B, TAG_C, and TAG_D within a selected row of cache directory 222 are compared to the thirteen bits of the address tag field in the presented address, Add[0–12], by comparators 226. However, comparators 226 also compare a fourteenth bit to a logic "1".

As noted above, during 1 MB operation the four address tags within a selected cache directory row are logically treated as two sets of two address tags, effectively implementing two way set associativity. Comparison of the fourteenth bit by comparator 226 allows one of the two sets to be selected. When a 1 MB cache memory is employed (signal 1 MB_Mode is asserted), late select Add[25] within the index field of the presented address is utilized to select one of the sets of address tags. Logic gates 230a and 230b invert Add[25], while logic gates 230c and 230d simply pass through the state of Add[25]. (The other input to logic gates 230a–230d, the inverted 1 MB_Mode signal, will always be nonasserted when a 1 MB cache is employed). Logic gates 230a–230d thus permit Add[25] and its complement to be simultaneously compared to a logic "1" by comparators 226. Only one pair of address tags, TAG_A and TAG_B or TAG_C and TAG_D, may result in a possible match by comparators 226, depending on the state of Add[25]. Therefore, Add[25] has the effect of selecting one group of address tags and inhibiting the other group (or groups) at comparators 226. Basically this mechanism treats the directory and cache as two-way set associative. The output of comparators 226, signals HIT_A, HIT_B, HIT_C and HIT_D, is employed by multiplexer 228 to select a cache line from the selected row as the cache data output. The output signals of comparators 226 may also be employed by other logic as described above.

When a 2 MB cache memory is employed in the alternative embodiment depicted, 1 MB_Mode signal is not asserted, but is inverted (to a logic "1") and passed by logic gates 230a–230d to comparators 226 for comparison as the fourteenth bit (also a logic "1"). All four address tags TAG_A, TAG_B, TAG_C and TAG_D within a selected cache directory row are thus capable of resulting in a match with the address tag field of a presented address. In addition to increasing the size of the cache line, the upgrade also increases the associativity to four way set associativity. The output signals of comparators 226 are employed by multiplexer 228 to select a cache line within the selected row of cache memory 224.

Although the exemplary embodiment depicted in FIG. 2B relates to two groups of two address tags (two way set associativity) and one group of four address tags (four way set associativity), the present invention may be employed in other configurations. For example, the alternative embodiment may be implemented as four sets of four address tags (four way set associativity) and two sets of eight address tags (eight way set associativity).

The present invention eliminates multiplexing of address bus inputs from the critical address-to-directory and address-to-cache address paths. Additionally, the critical output of the directory (address tags) does not require multiplexing but is passed directly to the comparators. This speeds up the "hit" logic and the cache data path via late selects. The increased associativity achieved by upgrading the alternative embodiment improves overall performance, as does the elimination of multiplexing from the address flow to internal queues for loading and snoop collision comparison.

In the present invention, the same field from an address is employed to index cache directory and memory rows regardless of the size of the cache memory. The same set of bits is utilized to select the congruence class regardless of whether the cache is, for example, 1 MB or 2 MB. This eliminates the need for multiplexing and the associated delays within the critical address path, the path by which the index field of the address reaches the directory and cache access functions. Congruence classes (or rows) within the cache directory and memory are logically treated as multiple groups, each group containing multiple address tags or cache lines. A group is selected from a particular congruence class based on address bits selected according to the cache memory size. However, this selection may be performed in parallel with the directory and cache access and does not increase latency. The members of a selected group of address tags are compared in parallel with the address tag field from the address, allowing selection of the appropriate cache line in the corresponding group of cache lines. The same number of bits are utilized in comparing address tags to the address tag field, regardless of the size of the cache memory. This reduces the amount of logic required for the comparison process.

The same associativity (i.e. the same number of groups per row with the same number of address tags or cache lines per group) may be employed for cache memory sizes being addressed, or different associativity may be employed depending on the size of the cache memory being utilized. Thus, for example, a 2-way/4-way set associative configuration may be utilized for a 1 MB/2 MB cache memory while an 4-way/8-way set associative configuration is utilized for a 2 MB/4 MB cache memory.

The cache directory addressing scheme of the present invention may be applied to variable size caches, and thus supports upgradeable caches in data processing systems. Because the same field from the address is utilized to index the cache directory and memory regardless of the size of the cache memory, no multiplexing logic in the critical address path is required to support upgradeable caches. The directory addressing scheme of the present invention achieves more associativity of address tags to corresponding cache lines than existing addressing schemes without incurring additional overhead. The cache directory addressing scheme of the present invention also creates a 1:1 address flow and provides efficient utilization of the cache directory. The present invention may be advantgeously employed with even/odd directory parity mechanisms or in conjunction with redundant, processor-side and snoop-side cache directory configurations.

While the invention has been particularly shown and described with reference to a preferred embodiment, it will be understood by those skilled in the art that various changes in form and detail may be made therein without departing from the spirit and scope of the invention.

What is claimed is:

1. A method of addressing a cache directory for a variable size cache, comprising:

selecting at least one congruence class within a cache directory utilizing an index field from an address;

for a first cache size, employing an address bit from the address to either select a congruence class among congruence classes selected utilizing the index field, or select one group of cache directory entries within a congruence class selected utilizing the index field;

for a second cache size, comparing a mode bit to a predetermined logic state at one or more comparators comparing an address tar to cache directory entries to enable selection of any cache directory entry within the selected congruence class or group of cache directory entries;

comparing an address tag field from the address to each cache directory entry within the selected congruence class or group of cache directory entries; and responsive to identifying a match between a cache directory entry and the address tag field, selecting a portion of a cache memory associated with the matching cache directory entry.

2. The method of claim 1, wherein the step of selecting a congruence class within a cache directory utilizing an index field from an address further comprises:

utilizing the same index field from the address to select a congruence class regardless of the cache size.

3. The method of claim 1, wherein the step of selecting a congruence class within a cache directory utilizing an index field from an address further comprises:
   directly utilizing the index field without multiplexing the index field from the address.

4. The method of claim 1, wherein the step of employing an address bit from the address to select one group of cache directory entries within a congruence class selected utilizing the index field further comprises:
   selecting one of two groups of cache directory entries from the selected congruence class while inhibiting a second group.

5. The method of claim 1, wherein the step of employing an address bit from the address to select one group of cache directory entries within a congruence class selected utilizing the index field further comprises:
   comparing the address bit and a complement of the address bit to the predetermined logic state.

6. The method of claim 1, further comprising:
   for the first cache size, employing a first bit from the address as a late select for selecting a congruence class; and
   for the second cache size, employing a second bit from the address as the late select for selecting a congruence class.

7. The method of claim 1, further comprising:
   for the second cache size, writing a selected bit within each cache directory entry to the predetermined logic state.

8. The method of claim 1, further comprising:
   logically dividing each row of the cache directory into n groups of cache directory entries, each group of cache directory entries including m cache directory entries; and
   logically dividing each row of a cache memory into n groups of cache lines, each group of cache lines including m cache lines, each group of cache lines associated with a corresponding group of cache directory entries in a same row within the cache directory.

9. The method of claim 1, further comprising:
   utilizing a first field from the address as an intra cache line address when an associated cache memory has a first size; and
   utilizing a second field different from the first field from the address as an intra cache line address when the associated cache memory has a second size.

10. The method of claim 1, further comprising:
    utilizing a first associativity between directory entries and cache lines when an associated cache memory has a first size; and
    utilizing a second associativity different from the first associativity between directory entries and cache lines when the associated cache memory has a second size.

11. A cache directory addressing mechanism for a variable size cache, comprising:
    a cache directory containing a plurality of congruence classes, each congruence class including n groups of m cache directory entries;
    a cache memory containing a plurality of congruence classes, each congruence class including n groups of m cache lines, each group of cache lines in a congruence class associated with a corresponding group of cache directory entries in a same congruence class of the cache directory;
    selection logic selecting at least one congruence class within the cache directory utilizing an index field from an address, wherein the selection logic
    (a) for a first cache size, employs an address bit from the address either
      (1) as a late select within the cache directory or
      (2) to select group of cache directory entries within the selected congruence class, and
    (b) for a second cache size, compares a mode signal to a predetermined logic state at one or more comparators comparing an address tag to cache directory entries to enable selection of any cache directory within the selected congruence class or group of cache directory entries;
    at least one comparator comparing an address tag field from the address to each cache directory entry within the selected group of cache directory entries; and
    a multiplexer selecting a cache line in the cache memory corresponding to a matching cache directory entry in response to a match being identified between a cache directory entry within the selected group of cache directory entries and the address tag field.

12. The mechanism of claim 11, wherein the cache directory further comprises:
    two groups of cache directory entries in each congruence class.

13. The mechanism of claim 11, wherein the cache directory further comprises:
    n groups of two cache directory entries in each row.

14. The mechanism of claim 11, wherein the directory lookup further comprises:
    a directory lookup utilizing the same index field from the address to select a congruence class within the cache directory regardless of a size of the cache memory.

15. The mechanism of claim 11, further comprising:
    a logic gate passing either an address tag bit or the mode signal to the at least one comparator for comparison to a corresponding bit within each cache directory entry.

16. The mechanism of claim 15, further comprising:
    a logic gate passing either a complement of the address tag bit or the mode signal to a second comparator for comparison to a corresponding bit within each cache directory entry.

17. The mechanism of claim 15, further comprising:
    logic utilizing the address tag bit and a complement of the address tar bit to select a group of cache directory entries within the selected congruence class when an associated cache memory has a first size; and
    logic utilizing a complement of the mode signal to select a group of cache directory entries within the selected congruence class when the associated cache memory has a second size.

18. The mechanism of claim 11, wherein each congruence class of the cache directory is logically divided into n groups of cache directory entries with each group of cache directory entries including m cache directory entries, and each congruence class of a cache memory is logically divided into n groups of cache lines with each group of cache lines including m cache lines and with each group of cache lines being associated with a corresponding group of cache directory entries in a same congruence class within the cache directory.

19. The mechanism of claim 11, further comprising:
    logic utilizing a first field from the address as an intra cache line address when an associated cache memory has a first size; and
    logic utilizing a second field different from the first field from the address as an intra cache line address when the associated cache memory has a second size.

20. The mechanism of claim 18, wherein:

the directory entries have a first associativity to the cache lines when an associated cache memory has a first size; and the directory entries have a second associativity different from the first associativity to the cache lines when the associated cache memory has a second size.

21. A method of addressing a cache directory for a variable size cache, comprising:

selecting a congruence class within a cache directory utilizing an index field from an address;

for a first cache size, comparing an address tag field from the address to each cache directory entry within the selected group of cache directory entries;

for a second cache size, comparing a portion of the address tag field and a mode bit to each cache directory entry; and responsive to identifying a match of either the address tag field for the first cache size or the portion of the address tag field and the mode bit for the second cache size to a cache directory entry, selecting a portion of a cache memory associated with the matching cache directory entry.

22. A method of addressing a cache directory for a variable size cache, comprising:

selecting a congruence class within a cache directory utilizing an index field from an address;

for a first cache size, employing an address bit from the address to select one group of cache directory entries within the selected congruence class;

for a second cache size, selecting one group or cache directory entries within the selected congruence class;

comparing an address tag field from the address to each selected cache directory entry; and responsive to identifying a match between a selected cache directory entry and the address tag field, selecting a portion of a cache memory corresponding to the matching cache directory entry.

* * * * *

UNITED STATES PATENT AND TRADEMARK OFFICE
CERTIFICATE OF CORRECTION

PATENT NO. : 6,192,458 B1
DATED : February 20, 2001
INVENTOR(S) : Arimilli et al.

It is certified that error appears in the above-identified patent and that said Letters Patent is hereby corrected as shown below:

<u>Column 11,</u>
Line 1, please delete "18" and insert -- 11 --.

<u>Column 12,</u>
Line 11, please delete "one group or" and insert -- all --.

Signed and Sealed this

Nineteenth Day of March, 2002

Attest:

JAMES E. ROGAN
*Director of the United States Patent and Trademark Office*

*Attesting Officer*